United States Patent
Learned et al.

(10) Patent No.: US 7,126,890 B2
(45) Date of Patent: Oct. 24, 2006

(54) MULTITRACK READBACK AND MULTIUSER DETECTION FOR DISK DRIVES

(75) Inventors: Rachel E. Learned, Waltham, MA (US); Robert B. MacLeod, Nashua, NH (US)

(73) Assignee: Bae Systems Information and Electronic Systems Integration INC, Nashua, NH (US)

( * ) Notice: Subject to any disclaimer, the term of this patent is extended or adjusted under 35 U.S.C. 154(b) by 289 days.

(21) Appl. No.: 10/497,557

(22) PCT Filed: Sep. 19, 2003

(86) PCT No.: PCT/US03/29039

§ 371 (c)(1),
(2), (4) Date: Jun. 30, 2004

(87) PCT Pub. No.: WO2004/027763

PCT Pub. Date: Apr. 1, 2004

(65) Prior Publication Data

US 2005/0036437 A1   Feb. 17, 2005

Related U.S. Application Data

(63) Continuation-in-part of application No. 10/251,187, filed on Sep. 20, 2002, now Pat. No. 6,826,140, which is a continuation-in-part of application No. 10/228,787, filed on Aug. 26, 2002, now Pat. No. 6,947,502.

(51) Int. Cl.
*G11B 7/00* (2006.01)

(52) U.S. Cl. ............... 369/44.32; 369/44.28; 369/53.33

(58) Field of Classification Search ............ None
See application file for complete search history.

(56) References Cited

U.S. PATENT DOCUMENTS

| | | | |
|---|---|---|---|
| 5,790,606 A | 8/1998 | Dent | |
| 5,982,813 A | 11/1999 | Dutta et al. | |
| 6,122,269 A | 9/2000 | Wales | |
| 6,198,775 B1 | 3/2001 | Khayrallah et al. | |
| 6,219,341 B1 | 4/2001 | Varanasi | |
| 6,826,140 B1* | 11/2004 | Brommer et al. | 369/94 |
| 6,947,505 B1* | 9/2005 | Learned | 375/346 |
| 2002/0037061 A1 | 3/2002 | Learned | |

OTHER PUBLICATIONS

Abbott, W. L. et al., "Offtrack Interference and Equalization in Magnetic Recording", IEEE Transactions on Magentics, Nov. 1988, pp. 2964-2966, vol. 24, No. 6.

Saliba, George, "Laser Guided Magnetic Recording", Computer Technology Review, Jul. 2000, pp. 1-2, vol. XX, No. 7. West World Productions, Inc.

Saliba, George, "The Anatomy of Super DLTtape", Computer Technology Review, Aug. 2000, p. 1, vol. XX, No. 8. West World Productions, Inc.

(Continued)

*Primary Examiner*—Muhammad Edun
(74) *Attorney, Agent, or Firm*—Maine & Asmus

(57) ABSTRACT

Techniques for reading data from a storage medium (150) having a high track density prone to adjacent track interference are disclosed. One or more sensing elements (120) are used to extract data stored on adjacent tracks. Multiuser detection (130) is then used to detect/decode a single track that is closely spaced to its neighboring tracks, resolve interference from adjacent tracks, or to simultaneously detect/decode multiple adjacent closely packed tracks.

22 Claims, 8 Drawing Sheets

OTHER PUBLICATIONS

Gallager, R. G. "Low-Density Parity-Check Codes", IRE Transactions on Information Theory, Jan. 1962, pp. 21-28.

Barbosa, Lineu C., "Simultaneous Detection of Readback Signals from Interfering Magnetic Recording Tracks Using Array Heads", IEEE Transactions on Magnetics, Sep. 1990, pp. 2163-2165, vol. 26, No. 5.

Vea, Mathew P. et al. "Magnetic Recording Channel Model with Intertrack Interference", IEEE, 1991, pp. 4834-4836.

Tsang, Ching et al. "Gigabit-Density Magnetic Recording", IEEE, Sep. 1993, pp. 1344-1359, vol. 81, No. 9.

Moon, Jaekyun, "The Role of SP in Data-Storage", IEEE Signal Processing Magazine, Jul. 1998, pp. 54-72, William Westeimer/The Stock Market.

Soljanin, Emina et al. "Multihead Detection for Multitrack Recording Channels", IEEE Transactions on Information Theory, Nov. 1998, pp. 2988-2997, vol. 44, No. 7.

Oenning, Travis et al. "Modeling the Lorentzian Magnetic Recording Channel with Transition Noise", IEEE Transactions on Magnetics, Jan. 2001, pp. 583-591, vol. 37, No. 1.

Kurtas, Erozan et al. "Reduced Complexity Maximum Likelihood Sequence Estimation for Multitrack High-Density Magnetic Recording Channels", IEEE Transactions on Magnetics, Jul. 1999, pp. 2187-2193, vol. 35, No. 4.

Richardson, Thomas et al. "The Capacity of Low-Density Parity-Check Codes Under Message-Passing Decoding", IEEE Transactions on Information Theory, Feb. 2001, pp. 599-618, vol. 47, No. 2.

Richardson, Thomas et al. "Design of Capacity-Approaching Irregular Low-Density Parity-Check Codes", IEEE Transactions on Information Theory, Feb. 2001, pp. 619-637, vol. 47, No. 2.

Yeo, Engling et al. "High Throughput Low-Density Parity-Check Decoder Architectures", IEEE, 2001, pp. 3019-3024.

Yeo, Engling et al. "VLSI Architectures for High-Speed Interative Decoders", BWRC Winter Retreat, Jan. 2002, p. 1.

Roh, Bong Gyun et al. "Single-Head/Single-Track Detection in Interfering Tracks", IEEE Transactions on Magnetics, Jul. 2002, pp. 1830-1838, vol. 38, No. 4.

Chung, Sae-Young et al. "On the design of low-density parity-check codes within 0.0045 dB of the Shannon limit", pp. 1-3.

Xie, Zhenhua et al. "Joint Signal Detection and Parameter Estimation in Multiuser Communications", IEEE Transactions on Communications, Aug. 1993, pp. 1208-1216, vol. 41, No. 7.

Poor, H. Vincent, "Turbo Multiuser Detection: An Overview", IEEE 6th Int. Symp. on Spread-Spectrum Tech. & Application, Sep. 6-8, 2000, pp. 583-587, NJIT, New Jersey.

Leonhardt, T. D. et al. "Comparison of Perpendicular and Longitudinal Magnetic Recording Using a Contact Write/Read Tester", pp. 1580-1582.

* cited by examiner

MULTITRACK READBACK AND MULTIUSER DETECTION FOR DISK DRIVES

RELATED APPLICATIONS

This application is a continuation-in-part of U.S. application Ser. No. 10/251,187, filed Sep. 20, 2002, now U.S. Pat. No. 6,826,140 which is a continuation-in-part of U.S. application Ser. No. 10/228,787, filed Aug. 26, 2002 now U.S. Pat. No. 6,947,502. This application is also related to U.S. application Ser. No. 10/423,740, filed Apr. 25, 2003. Each of these applications is herein incorporated in its entirety by reference.

FIELD OF THE INVENTION

The invention relates to magnetic disk drives, and more particularly, to multitrack readback heads that employ multiuser detection so as to enable increased storage capacity without having to increase the size of the disk or of the disk drive, and without compromising data integrity.

BACKGROUND OF THE INVENTION

Magnetic recording devices, such as magnetic disk and tape drives, use heads to read and write information to and from a magnetic surface. In a typical rotating storage device, data is stored on magnetic disks in a series of concentric tracks. These tracks are accessed by the read/write head, which detects variations in the magnetic orientation of the disk surface. Note that a track generally refers to a segment parallel to relative motion of the head. The read/write head moves back and forth radially on the disk under control of a head-positioning servo mechanism so that the head can be selectively positioned over a specific track.

In more detail, an actuator arm typically moves the head across the data tracks under the control of a servo system based on servo data stored on the disk surface within dedicated servo fields. The servo fields can be interleaved with data sectors on the disk surface or on a separate disk surface that is dedicated to storing servo information. As the head passes over the servo fields, it generates a readback signal that identifies the location of the head relative to the centerline of the desired track. Based on this location, the servo system rotates the actuator arm to adjust the head's position so that it follows the center line of the selected track.

One parameter that impacts the overall storage capacity of such rotating storage devices is referred to as track density (e.g., tracks per inch). The greater the track density, the greater number of tracks that can be recorded on the disk, thereby providing greater overall data storage capacity. A known factor limiting track density is referred to as adjacent track interference.

In particular, as track density increases, the information from several tracks will appear mixed together on the readback head, thereby degrading signal integrity. Thus, even though write heads are technically capable of writing into smaller areas (thereby enabling the dense packing of a storage disk), the available read heads tasked with extracting the stored data have limitations that restrict the size of the storage cells and track spacing.

To avoid this adjacent track interference so as to maintain data integrity, conventional disk drives are required to write the tracks sufficiently far apart (lateral separation) to effectively reduce the amplitude of the adjacent interfering tracks. Guard bands are used to separate neighboring tracks. No usable data can be stored in the guard bands. A single readback signal is used in retrieving the stored data from the tracks of the disk.

Readback intelligibility (i.e., data integrity) is therefore achieved by spatially separating the magnetic information on the disk. This required separation of tracks on the disk limits the track density of the drive for a given disk size and geometry. Moreover, storage capacity is fundamentally limited and can only be increased by increasing the size or number of layers on the disk.

What is needed, therefore, are techniques for increasing the readback intelligibility for densely packed disks. In a more general sense, there is a need for techniques that increase storage capacity without having to increase the size of the disk or of the disk drive.

BRIEF SUMMARY OF THE INVENTION

One embodiment of the present invention provides a device for reading data from a storage medium having a high track density prone to adjacent track interference. The device includes a data reader that has one or more sensing elements adapted to read data from the storage medium. The read data includes target track data as well as interference data from one or more adjacent tracks. A multiuser detection module is adapted to jointly detect and decode the read data corresponding to multiple tracks, thereby separating the target track data from interfering track data. The storage medium can be, for example, a data storage tape or disk (e.g., magnetic, optical, etc.).

In one such embodiment, the data reader includes a single sensing element that is adapted to make multiple passes over the storage medium, one pass for each adjacent track included in a group of tracks. In another such embodiment, the data reader includes multiple sensing elements for simultaneously sensing multiple tracks, with one or more sensing elements per each adjacent track included in a group of tracks. Here, the multiple sensing elements can be proximate one another, but they need not be. In either embodiment, the group of tracks can be, for example, three to five adjacent tracks.

The data reader may further include an analog-to-digital converter for converting the read data into its digital equivalent, and a buffer for storing the digital data, thereby allowing digital data from a group of adjacent tracks to be provided to the multiuser detection module. In one particular embodiment, the multiuser detection module is operatively coupled with a parameter estimation module that is adapted to identify the track transfer function associated with group of adjacent tracks read by the one or more sensing elements. A track transfer function includes envelope information of a shape, amplitude and phase of each track of the group.

In another particular embodiment, each of the one or more sensing elements is centered over at least one of a different radius on the storage medium, a different track on the storage medium, or a different read line on the storage medium (basically over any unique position on the storage medium). The device may further include a data selector module that is adapted to receive separated and decoded track signals from the multiuser detection module, and to output requested data bits corresponding to at least one of a single track or multiple tracks. The device may further be capable of writing data to the storage medium, and include a data writer.

Another embodiment of the present invention provides a method for reading data from a storage medium having a high track density prone to adjacent track interference. The method includes reading data from the storage medium, where the read data includes target track data as well as interference data from one or more adjacent tracks. The method further includes jointly detecting and decoding the read data corresponding to multiple tracks, thereby separating the target track data from interfering track data.

In one such embodiment, reading data from the storage medium includes making multiple passes over the storage medium with a sensing element, one pass for each adjacent track included in a group of tracks. In an alternative embodiment, reading data from the storage medium includes simultaneously sensing multiple tracks, with one or more sensing elements per each adjacent track included in a group of tracks (e.g., 10 read heads uniquely positioned over a span of three adjacent tracks). Note that in either case, the group of tracks can be, for example, two, three, five, etc adjacent tracks. Numerous head and track combinations are possible here.

The method may further include converting the read data into its digital equivalent, and storing the digital data, thereby allowing digital data from a group of adjacent tracks to be provided to the multiuser detection module. The method may further include identifying the track transfer function associated with a group of adjacent tracks read by one or more sensing elements. As previously stated, a track transfer function includes envelope information of a shape, amplitude and phase of each track of the group. The method may further include outputting requested data bits corresponding to at least one of a single track or multiple tracks. In one particular embodiment, reading data from the storage medium further includes centering each of one or more sensing elements over at least one of a different radius on the storage medium or a different track on the storage medium or a different read line on the storage medium.

Another embodiment of the present invention provides a device for reading data from a storage medium having a high track density prone to adjacent track interference. This device includes one or more sensing elements adapted to read data from the storage medium. The read data includes target track data as well as interference data from one or more adjacent tracks. The device further includes one or more positioning arms that are operatively coupled to the one or more sensing elements, and adapted to center each sensing element over at least one of a different radius on the storage medium or a different track on the storage medium or a different read line on the storage medium. The device further includes a multiuser detection module that is adapted to jointly detect and decode the read data corresponding to multiple tracks, thereby separating the target track data from interfering track data.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 5a illustrates a top view of a disk drive track layout, while

DETAILED DESCRIPTION OF THE INVENTION

Embodiments of the present invention implement a multiuser detection (MUD) receiver in the context of a multitrack readback disk drive application, thereby enabling increased readback intelligibility for densely packed disks, as well as increased storage capacity without having to increase the size of the disk or of the disk drive. Multiple read heads or virtual multiple read heads are employed to acquire signals from adjacent and interfering tracks. The acquired signals are then provided to a MUD processor for joint detection.

In a "virtual" multiple read heads embodiment, one read head makes multiple passes over the disk, one pass for each adjacent track. Alternatively, a collection of read heads are employed, with one read head per each adjacent track. In this case, the read heads need not be in close proximity of each other, and can even be at opposite sides of the disk (sometimes referred to as a platter). In either case, the use of multiple track readings combined with MUD techniques allow for interference mitigation and closer packing of tracks on a disk drive. A significant increase in the amount of data that can be written and read from a disk is thus realized.

Applications of the present invention include, for example, digital recording devices capable of multitrack increased density, such as tapes, disks, disk drives and virtually any device that has recorded data on a medium that is extracted by a sensing element.

Digital Recording Device Architecture

Figure 1:
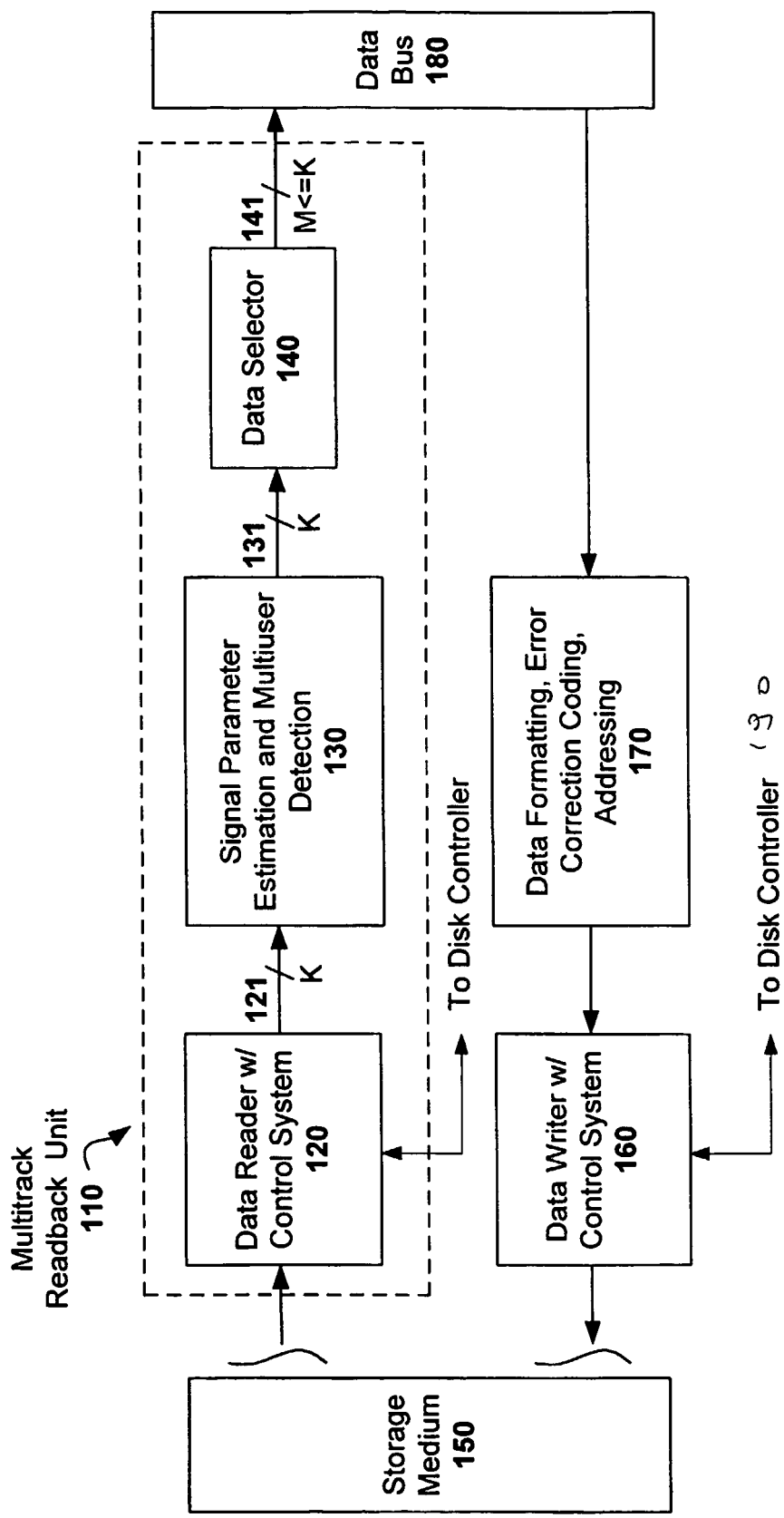
FIG. 1 illustrates a block diagram of a digital recording device configured in accordance with an embodiment of the present invention.

FIG. 1 illustrates a block diagram of a digital recording device configured in accordance with an embodiment of the present invention. As can be seen, the device includes a multitrack readback unit 110 having a data reader with control system 120, a signal parameter estimation and MUD module 130, and a data selector 140. The digital recording device further includes a storage medium 150, a data writer with control system 160, a data formatting and error correction coding and addressing module 170, and a data bus 180.

The digital recorder device is capable of storing digital data on the medium 150 using the data writer w/control system 160, which is capable of writing the data bits sufficiently close together on the medium 150 to create adjacent track interference when read by the data reader w/control system 120. In addition, data reader 120 is adapted to read data bits from multiple adjacent tracks or locations on the storage medium 150. The data reader 120 provides the sensed signals to module 130, which is capable of running the signal parameter estimation and separation algorithms, thereby enabling a high quality, high density recording device.

In read mode, the data reader 120 engages the medium 150 to acquire data stored thereupon. Data reader 120 includes one or more read heads (or other data sensors) each having a dynamic range that allows for differentiating the various levels of a composite signal comprised of the interfering signals. Embodiments and functionality of the data reader 120 will be discussed in more detail with reference to FIGS. 2, 3a–b, and 5a–b. The control system of the data reader 120 includes one or more servo mechanisms/ stepper motors for selectively engaging the read sensors with the storage medium 150, and can be implemented in conventional technology. The composite signal read from the medium 150 includes K signals/tracks, and is provided on line 121.

The signal parameter estimation and MUD module 130 is adapted to receive the K signals/tracks, and to perform signal/track parameter estimation and multiuser detection to jointly detect and decode all the data bits corresponding to the multiple read locations or tracks. Note that the interfering signals of adjacent tracks must have sufficient power relative to the noise floor to allow their detection and decoding. Embodiments and functionality of the module 130 will be discussed in more detail with reference to FIGS. 4a–c. Note, however, that conventional parameter estimation and MUD techniques can be employed here.

The data selector module 140, which can be implemented in conventional technology, receives the K separated and decoded track signals, and is adapted to output requested data bits corresponding to either a single track or location, or to multiple tracks or locations.

The recovered track data output on line 141 by selector 140 (as represented by M<=K separate bit or symbol streams) is then passed to, for example, a host system via the data bus 180. A number of conventional bus interface protocols, such as SCSI, ATA and LAN, can be implemented by data bus 180.

In write mode, a bit or symbol stream is sequenced into the module 170 via the data bus 180 for the purpose of recording the data signal corresponding to the bits or symbols of that stream on the storage medium 150. Conventional data formatting, error correction coding, and addressing is carried out by module 170. Thus, error codes are created and appended to the data to be written to the disk. Using a specified input address of the recording medium 150 as input, a disk controller (not shown) sequences the formatted, coded data to the control system of the data writer 160, which typically includes a pulse driver that outputs the write data in the form of an electrical signal to an armature amplifier and write head. The write head is implemented in conventional technology as well, and is further configured to convert the electrical signal of write data into a field appropriate for marking the data on the medium 150.

It will be appreciated that the disk controller sets coordination parameters such as clocking or synchronization, and cooperates with the servo mechanism/stepper motors and read/write head tracking controllers to move the read/write heads to their respective positions relative to the storage medium 150. It will further be appreciated that various such conventional system control mechanisms for scheduling the motion of the read and write sensors and communicating data to and from the digital recorder are possible here, and that the present invention is not intended to be limited to any one such configuration or embodiment.

Thus, the disclosed digital recording device applies parameter estimation and MUD techniques to mitigate adjacent track interference by simultaneously demodulating signals arising from multiple closely spaced tracks. Note that the scope of the invention is intended to include read-only devices as well, which eliminates the writing functionality and the associated componentry (e.g., modules 160 and 170).

In general, the purpose of reading the adjacent tracks is to measure an electrical signal corresponding to each interfering track, and it can be done in many ways, where the options fall into two broad categories: single head and multiple head configurations.

Single Head Data Reader

Figure 2:
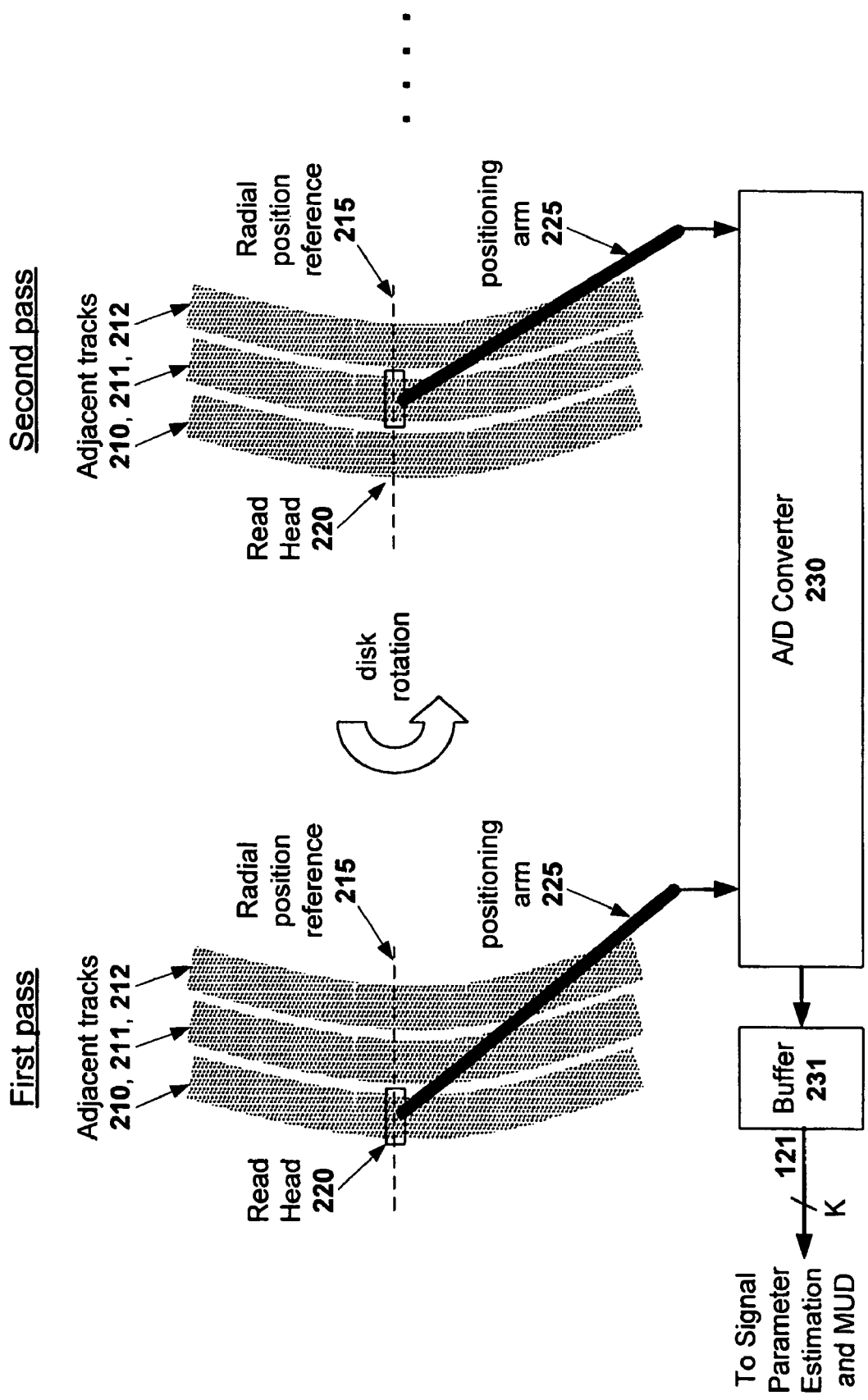
FIG. 2 illustrates a top view of a single read head data reader configuration in accordance with an embodiment of the present invention.

FIG. 2 illustrates a top view of a single read head data reader configuration in accordance with an embodiment of the present invention. As can be seen, one read head and a buffer are used to collect the signal from two or more adjacent tracks in series by making two or more passes over the disk where each pass is centered over a track of interest. The buffer allows temporary storage of the signal collected from each pass over the disk, one signal stream measured for each adjacent track. Note that, for proper function of the parameter estimation and MUD module 130, the read signal streams must be aligned to be synchronized in radial position so that the collection of signal streams appears as if they were collected with adjacent read heads. Thus, the MUD module 130 uses accurate position stamping of the measured signals to correspond the location of a dominant pulse in one signal stream to be the contributing interfering pulse in the adjacent measured stream.

In more detail, and with reference to FIG. 2, note the first and second passes over the disk made by read head 220. In the first pass, the read head 220 is positioned over a track 210 via the positioning arm 225. The measured signal is digitized with an analog to digital (A/D) converter 230, stamped with a disk location indicator, and then sent to a buffer 231. The disk location indicator stamp indicates the track number and the radial reference marker.

For the example shown here on the first pass, the disk location indicator stamp would indicate this signal stream as coming from track 210, and also indicate the position in the signal measurement that corresponds to the radial position reference 215. This radial position reference 215 is noted at a single snapshot in time as the disk spins. The location of the radial position reference 215 spins with the disk, and can be represented as a physical radial line as shown. The noted radial position reference 215 is arbitrary, but must remain consistent for each collection of adjacent track signals to ensure proper decoding by module 130.

In the second pass, the read head 220 has been moved over an adjacent track 211 via use of the positioning arm 225. As was done with track 210, the measured signal is digitized with an analog to digital (A/D) converter 230, stamped with a disk location indicator (including track ID and radial position reference 215), and then sent to a buffer 231. This data collection process can proceed to collect as many adjacent tracks as desired.

When the measured, reference stamped, and digitized signals from three adjacent tracks are input to the parameter estimation and MUD processing module 130, a high quality decoded bit stream will result for the middle track, even when the disk density is three times that of conventional disk densities. Variations on this scheme are possible as well. For example, if it is desired to simultaneously output adjacent bit streams (from adjacent tracks), then five adjacent tracks can be read and the output of the MUD processor will be of high quality for the middle three tracks. Note that all five could have high quality output if the way the tracks are written is modified. For instance, we could write tracks in groups of five closely spaced tracks with a larger guard zone on either side of the group.

Multiple Head Data Reader

Figure 3A:
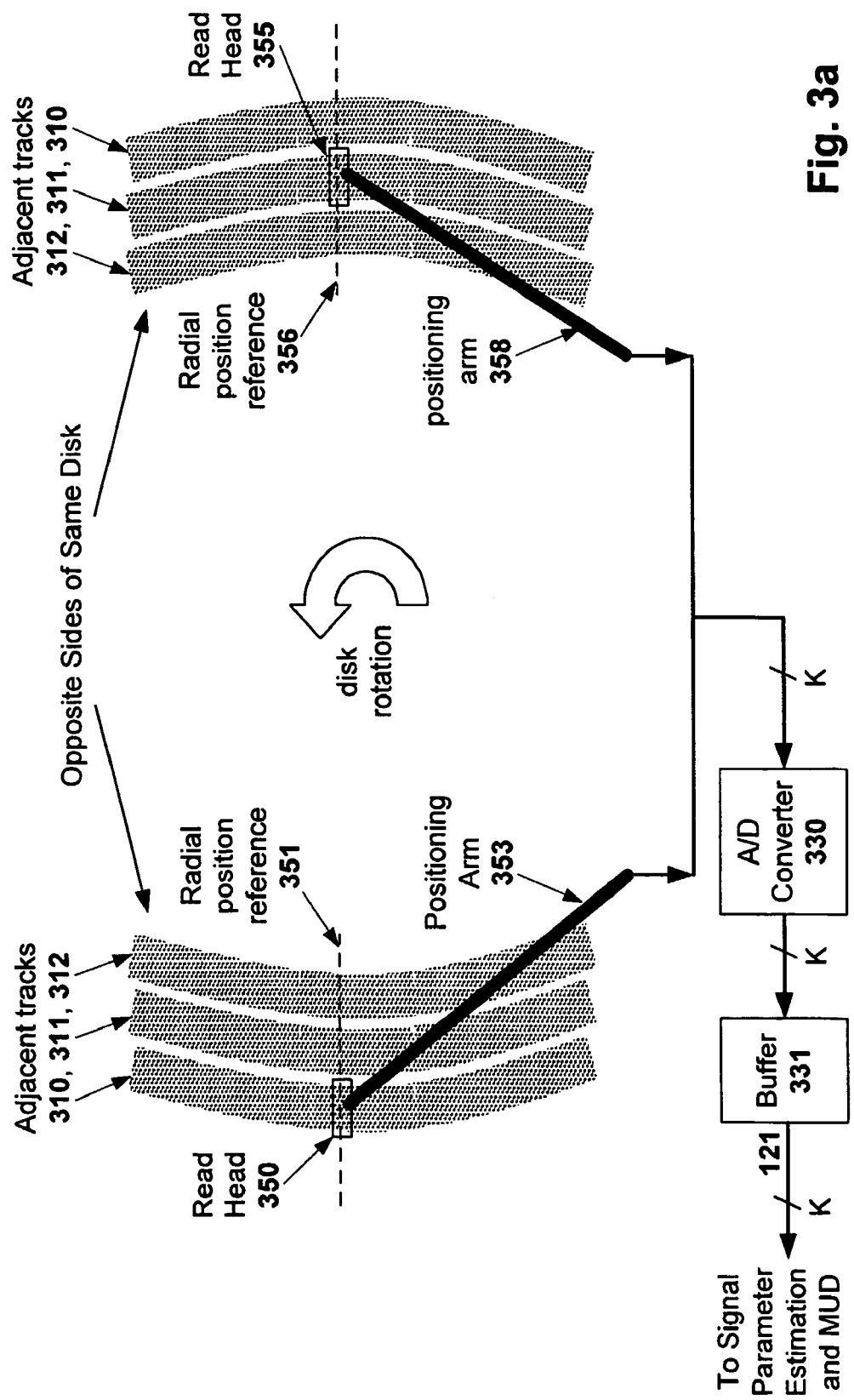
FIGS. 3a–b each illustrate a top view of a multiple read head data reader configuration in accordance with an embodiment of the present invention.

FIG. 3a illustrates a top view of a multiple read head data reader configuration in accordance with one embodiment of the present invention. In such a configuration, two or more read heads or other sensing elements simultaneously detect two or more respective adjacent tracks. Since this read head placement allows the read heads to not be physically located adjacent to one another, a buffer or delay element may still be required to allow for proper alignment of the signals streams so that measurements made from the same radial line can be co-located in sample number for the purpose of the MUD processing.

The embodiment shown in FIG. 3a has the read heads 350 and 355 located on opposite sides of the disk. If there are more than two read heads, then they could be located evenly spaced in angle as measured from the center of the disk. More generally, however, they could be put anywhere in relation to one another and in relation to various points on the circle corresponding to the disk as long as they each are located over a different adjacent track. In the example shown, read head 350 is located over track 310 and read head 355 is located over track 311.

Read head 350 is operatively coupled to a servo or stepper motor (not shown) by positioning arm 353, while read head 355 is operatively coupled to its servo or stepper motor (not shown) by positioning arm 358. The K electrical signals from the multiple heads are provided to an A/D converter 330, and the digital equivalents the K electrical signals are stored in buffer 331, along with the corresponding position stamps. Note that A/D converter 330 could be a bank of A/D converters, with one converter for each head. In any event, the one or more A/D converter 330 are used for converting the measured electrical signals into streams of samples of digital amplitudes.

As was discussed in reference to FIG. 2, the measured signal corresponding to each read element is stamped with a corresponding track number, and the appropriate sample of the signal stream must be associated with an arbitrary but consistent radial position reference. In this case, at a single snapshot in time as the disk spins, read head 350 has a radial position reference 351, and read head 355 has a different radial position reference 356. The measured signal streams sent to the buffer 331 each have a marker that indicates where the various collected signal streams correspond to the same radial reference on the disk.

For purposes of discussion and clarity, assume the in-track packing is the same as conventionally done, and each head of the multiple read head configuration is designed to track along the centerline of its corresponding track. In addition, assume that the lateral track spacing is on the order of the read head width. In this fashion, a three-track three-read head case could fit three tracks in the space traditionally allotted for only one track in a conventional single head case.

It will be appreciated that it is not necessary for each of the heads to read back the signals from its own track. Furthermore, it is not necessary that the three measured signal streams come from three separate read heads, as demonstrated by FIG. 2. In particular, a single read head could collect each signal stream, one after the other, and the three sets (or other grouping) of interfering signals streams could be placed in a buffer, and then passed on to the parameter estimation and MUD processor.

Figure 3B:
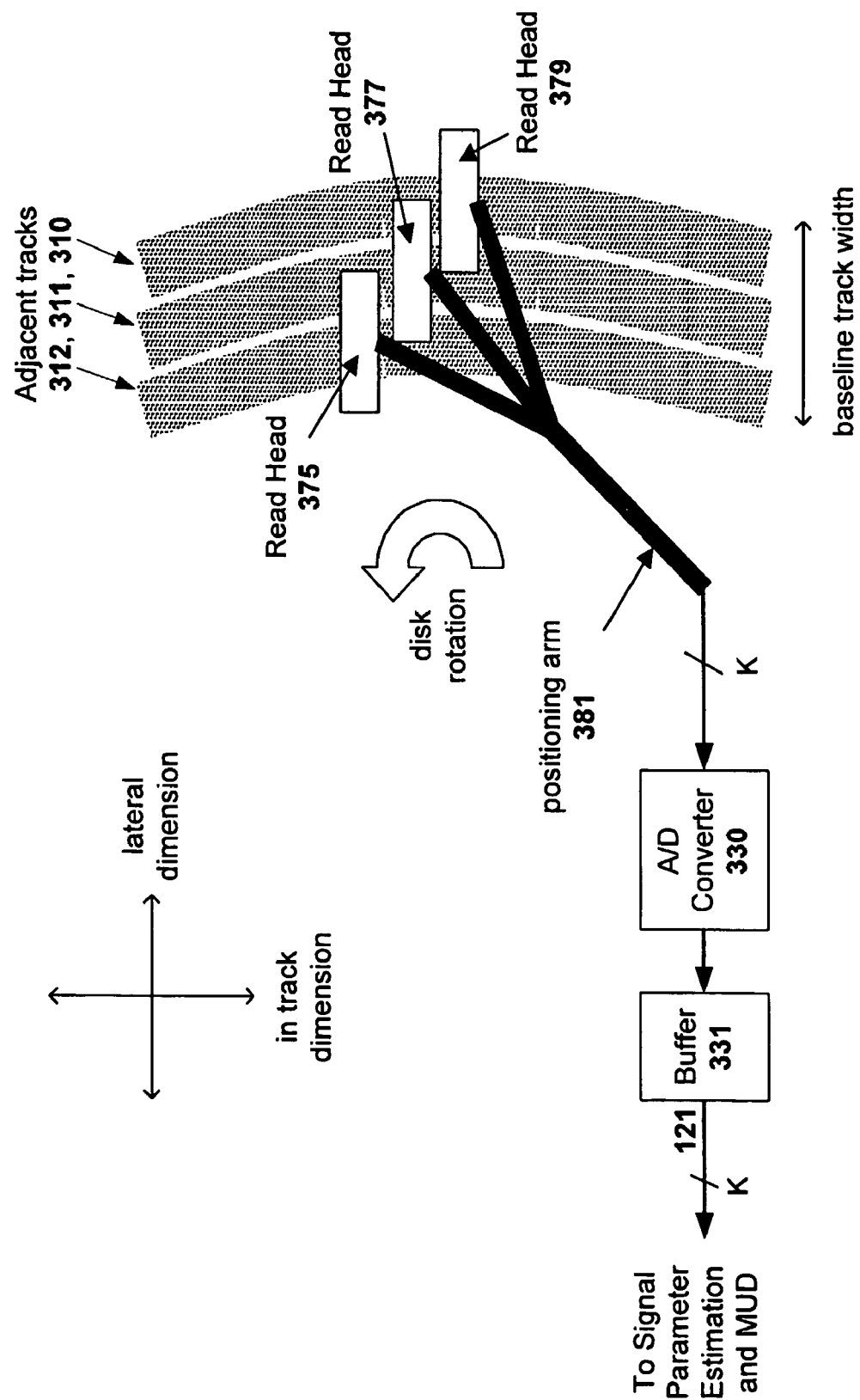

FIG. 3b illustrates a top view of a multiple read head data reader configuration in accordance with another embodiment of the present invention. In particular, the layout for a three read head case is shown, where read heads 375, 377, 379 are operatively coupled to a moving mechanism via positioning arm 381. Thus, a single positioning arm can be used as shown, having one prong per head and a single servo mechanism to move the heads simultaneously (assuming proper tracking is achieved). Alternatively, three distinct positioning arms can be used to ensure mechanical independency for proper tracking, with each arm coupled to its own stepper motor. Alternatively, the read elements can be stationary and the storage medium can be moveable. Alternatively, the read element and the storage medium can both be moveable. Many schemes for the purpose of ensuring proper tracking are possible here.

The read heads 375, 377, 379 are baseline width, and staggered to fit over the three ⅓ width tracks 310, 311, and 312. Readback leakage from adjacent tracks can be corrected by MUD processing. Note that the read heads 375, 377, 379 can have widths larger than the lateral packing widths or smaller. The best results occur when the set of read heads comprise a linearly independent span of the space spanned by the track signals. For example, five narrower read heads could be situated to cover the three tracks 310, 311, and 312. Also note that it does not matter whether the read heads are situated as neighbors in physical space or reside clear across the disk. So long as each head is centered over a different radius on the disk, preferably a different track. In a more general sense, so long as each head is centered over a different read line of the storage medium (basically over any unique position on the storage medium, whether it be a disk, tape, platter, or other storage medium).

A variation of moving read elements so that they are directly centered over each adjacent track is to employ excess multiple read heads. In such a case, no positioning arm and moving mechanism would be required. In particular, the heads can be used one per track or overlaid to ensure complete coverage of a storage region. The use of multiple heads is one means of extracting data simultaneously from multiple tracks in manner such that subsequent multiuser detection processing would be able to discern the correct bits per track.

Note, however, that merely adding more than two read heads to the system does not increase the density of the storage medium itself. Adding additional heads simply allows the bits to be extracted in parallel which increases speed. The reading capability, in combination with a storage medium having a high track density (such that adjacent track interference occurs at any one head), allows principles of the present invention to operate. Subsequent MUD processing can then separate out interfering track signals, thereby providing the target track signals, which may be a subset of all of the adjacent track signals read.

Further note that the storage medium having the high track density be implemented, for example, from any one of the following: floppy disks, hard disks, cubical disks, linear disks, multi-level disks, liner tapes, radial disks, compact disks, digital video disks, magneto optical disks, and rotating magnetic media. In addition, the data bits can be stored on the storage medium by a number of conventional storage technologies including, for example, magnetic, optical, magneto optical, electrostatic, and quantum technologies.

Figure 4A:
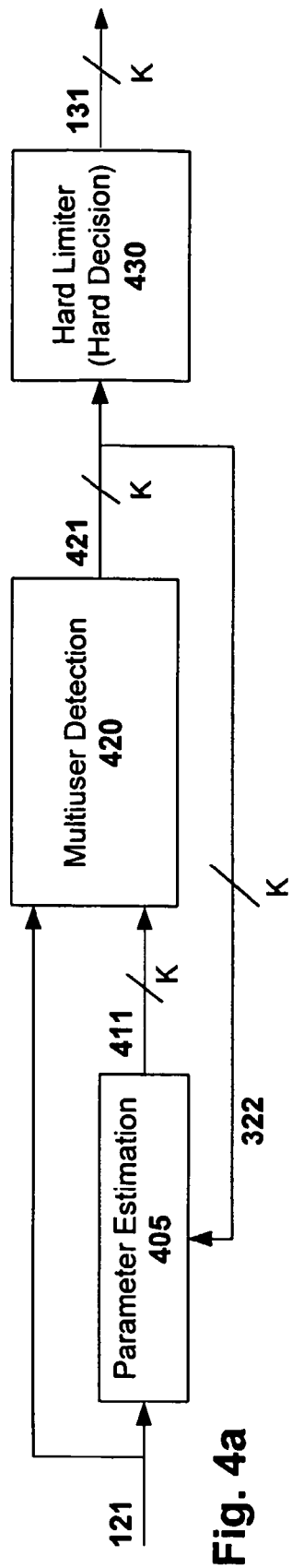
FIGS. 4a–c each illustrate a signal parameter estimation and multiuser detection module in accordance with one embodiment of the present invention.

FIG. 4a illustrates a signal parameter estimation and multiuser detection unit in accordance with one embodiment of the present invention. As can be seen, the unit includes a parameter estimation module 405, a multiuser detection module 420, and a hard limiter module 430 (sometimes referred to as a hard decision module). Numerous conventional parameter estimation, multiuser detection, and hard decision techniques can be employed here as will be apparent in light of this disclosure. In addition, a detailed description of such techniques is provided in U.S. application Ser. No. 10/423,740, titled "Co-channel Interference Receiver." Note that the present invention is not intended to be limited to any one such configuration.

In operation, the K digitized stamped/labeled measured signals streams, one for each adjacent track, are fed over line 221 to the parameter estimator module 405, which identifies a track transfer function as it would be measured by the collection of read heads, not just the read element over that track. The track transfer function includes envelope information of a shape, amplitude and phase of each of the plurality of data tracks. The signal stream can thus be mathematically represented by the summation of an amplitude weighted and time shifted version of a signature vector. The signature-vector is defined over a short period of time (or small number of samples) from each of K read heads. The total number of measurements or samples is the total number of dimensions, commonly referred to as N dimensions, where N is the number of samples per pulse times the number of read heads providing measurements to the MUD.

Each signature vector is a representation of a basis function that can be used to build a replica of any possible set of K measured signals piece by piece where each signature vector corresponds to the location of a bit transition for each read head associated with a track location. The function of the parameter estimation module 405 is to calculate with reasonable reliability the received amplitude corresponding to the signature signals that can be used to mathematically represent each transition Finally, the set of signal parameters is passed to the MUD processing module 420 over line 411, where a single set of parameters is estimated for each data bit or symbol as written on a single cell of a single track and as read by the K read heads at different radius, but all at the same radial location on the platter (or other storage medium). The MUD module 420 also receives the input from line 121, which is the received digitized and stamped set of measured signals.

The MUD processing module 420 can be implemented, for example, as a maximum likelihood MUD, TurboMUD, or linear algebra based multiuser detector. Module 420 can also employ a number of MUD algorithms including, for example, M-algorithm, T-algorithm, MT-algorithm based upon MAP, Log-MAP, or Max-Log MAP detectors, with our without the incorporation of error correction decoding.

It will be appreciated that various front end processing can be carried out on the data prior to its application to the parameter estimation and multiuser detection module 130. Such processing includes, for example, amplification, low pass filtering, and A/D conversion, and may be carried out in the data reader module 120, module 130, or in a separate front end module operatively coupled between the data reader module 120 and module 130.

Other variations will be apparent as well. For example, data selector 140 may further include a temporary storage buffer and an output multiplexer to enable parallel processing of the module 130 output. A whitening matched filter bank or a matched filter bank can be coupled to or otherwise included in module 130. There can also be a sector cache coupled to the module 130 for buffering the data. Other supporting functionality may also be included, such as error correction and decoding in the case where the received data stream is coded and/or modulated according to a particular scheme.

Figure 4B:
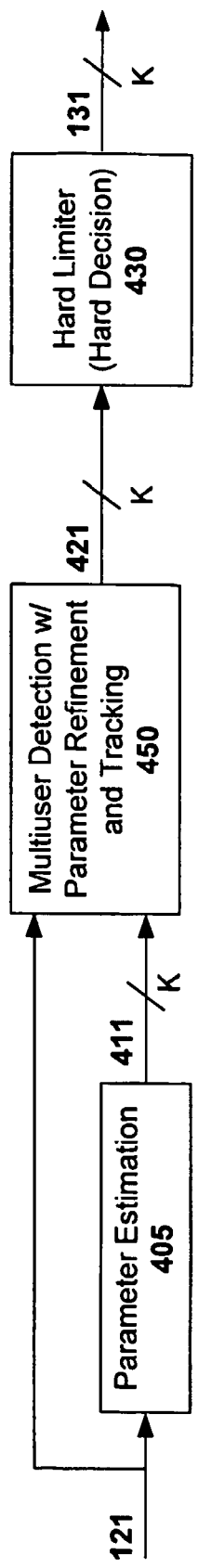
Figure 4C:
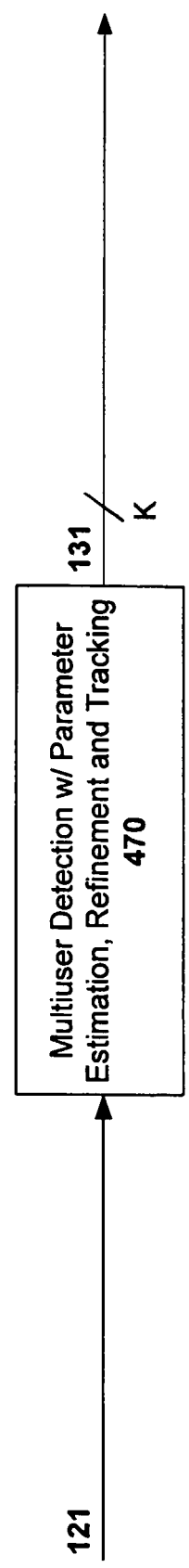

Further note the FIGS. 4b and 4c provide alternative embodiments to that shown in FIG. 4a. In particular, FIG. 4b eliminates the iteration path 322 between the output of module 420 and the input of module 405. Here, conventional parameter refinement and tracking techniques are internalized in MUD module 450. Similarly, FIG. 4c further internalizes the parameter estimator 405 and the hard limiter 430, thereby providing a single MUD processing module 470. Regardless of the desired modularity of the module 130, its functionality can be implemented in hardware, software, firmware, or any combination thereof.

Disk Drive Track Layout

Figure 5A:
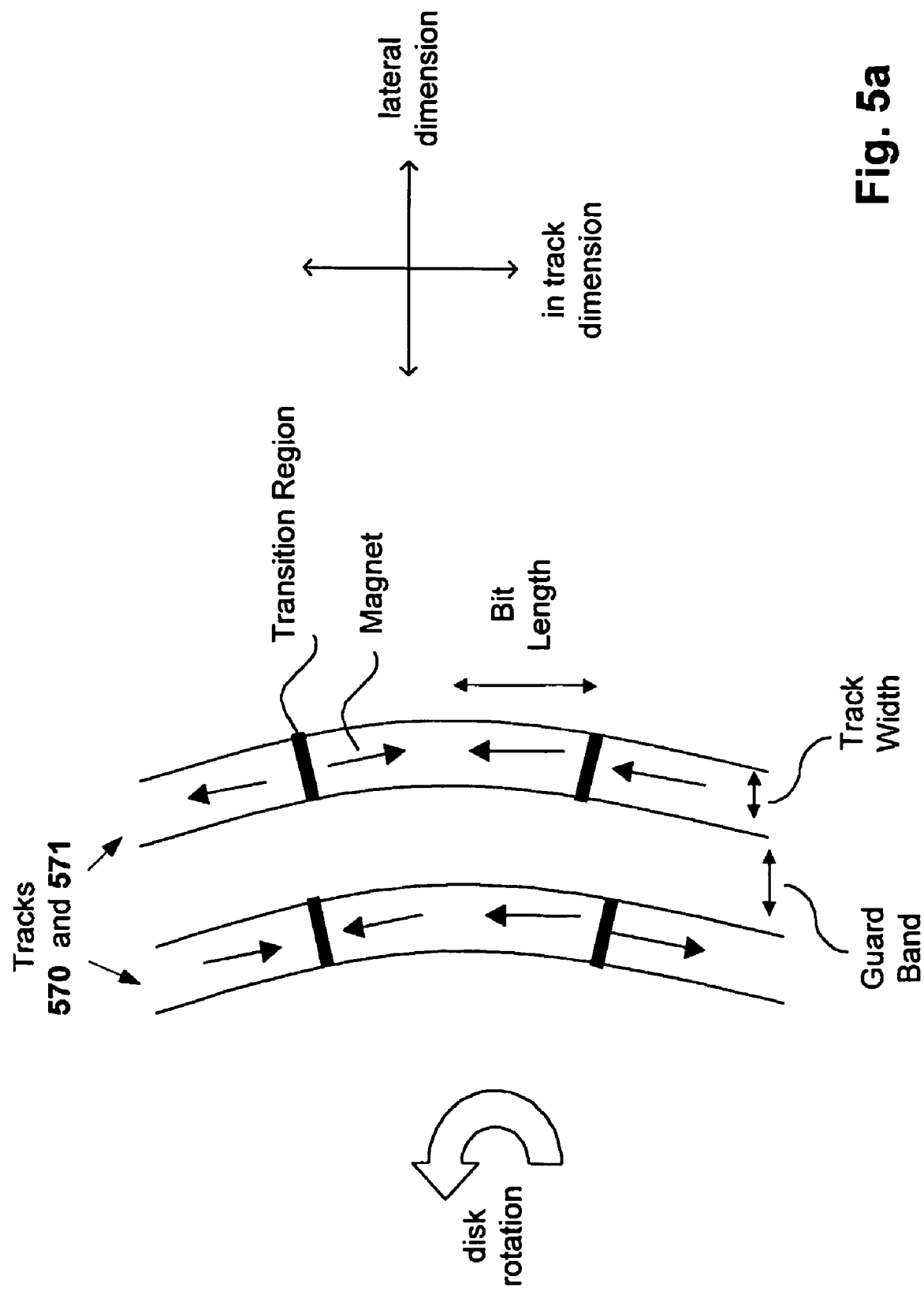

FIG. 5a illustrates a top view of a disk drive track layout. This layout demonstrates the basic geometry of the read/write system. As can be seen, the system writes a series of tracks 570 and 571 onto the drive, each of which comprises a series of magnetic orientations either with or against the path of the track. These patches of magnetic orientation are called magnets. The physical layout of the magnets is influenced by the speed at which the disk turns, the baud rate of data being written, how far the head moves laterally as each new track is written, and the physics and geometry of the write head.

Figure 5B:
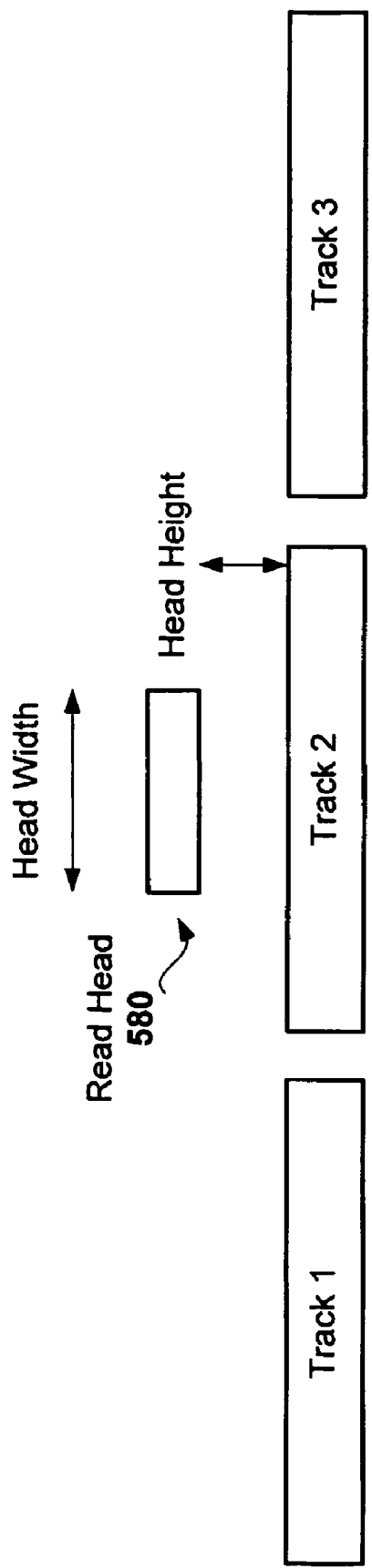
FIG. 5b illustrates a side view of a disk drive track layout.

FIG. 5b illustrates a side view of a disk drive track layout, looking back towards the read or write head. Note that the read/write heads 580 are distributed sources or collectors, and can be positioned very close to the disk, on the order of tens of nanometers. Assume a conventional baseline disk drive to have the following geometry and parameters:

| | |
|---|---|
| Track/bit width | 530 nM |
| Guard band | 10 nM |
| Bit length | 47 nM |
| Head height | 25 nM |
| Head width | 200 nM |
| rpm | 10,000 |
| Pw 50 | 3 symbols |

The last parameter listed (i.e., Pw 50) is the pulse width at 50 percent signal amplitude. The basic pulse created by the write/read operation is sharply peaked, and can be parameterized by this Pw 50 metric. The variable of time is non-dimensionalized in this description, so that the rpm and baud rate of the system conspire to write the magnets at the specified 47 nM in-track spacing (magnet or bit length). The waveforms measured by the read head passing over the disk can always therefore be drawn with a time axis labeled in symbols, or the time required for one magnet to pass under the read head.

Example Readout Signal

Figure 6B:
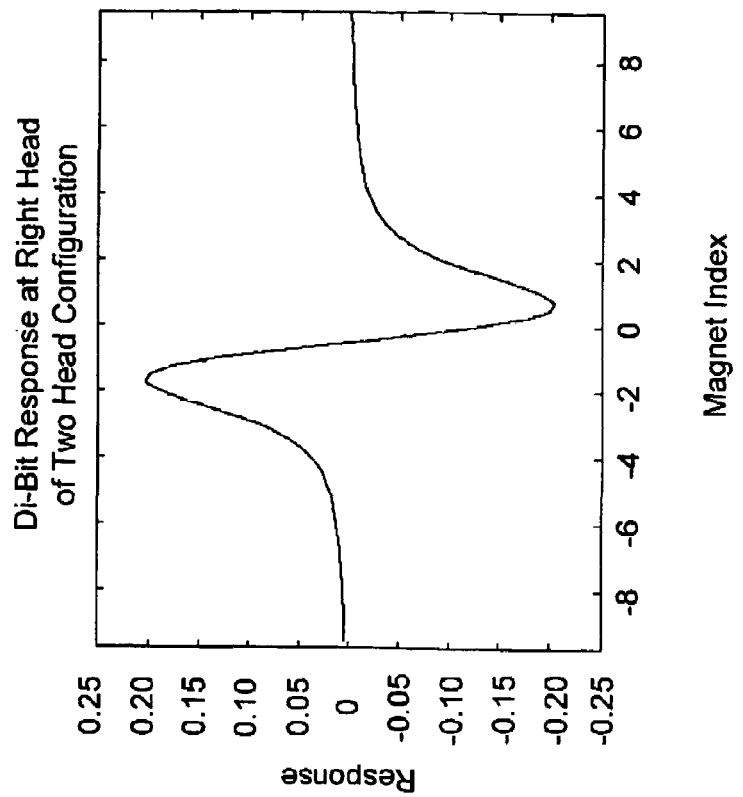
FIG. 6a-b each illustrate an example read-out signal for a transition passing under the right head of a two head case.
Figure 6A:
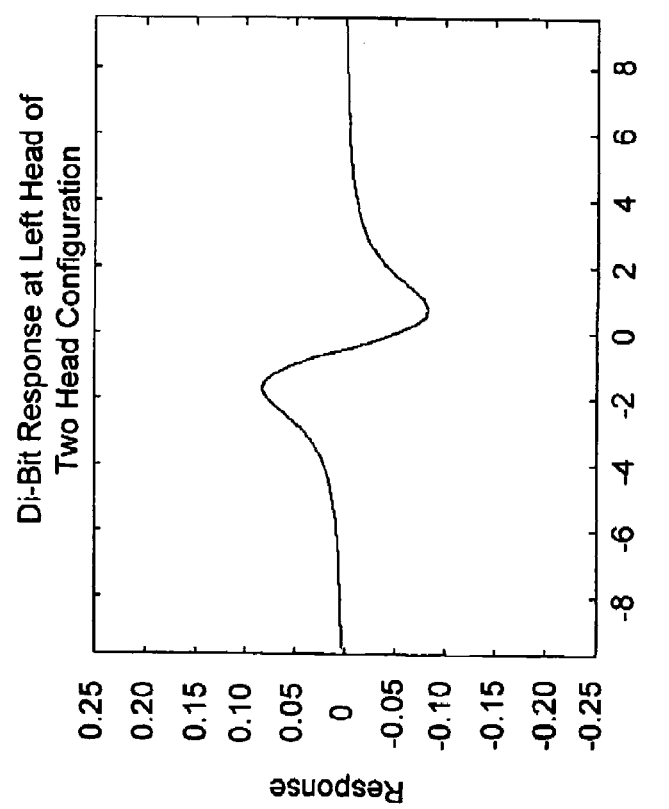

The signals appearing at the terminals of each of two heads are plotted side by side (left head in FIG. 6a, the right head in 6b). These are the signals due to one transition occurring under the right head. Specifically, FIG. 6a illustrates an example read-out signal from the left head for a transition passing under the right head of a two head case. If there were no transitions in the track under the left head, then FIG. 6b illustrates the read-out signal from the right head for a transition passing under the right head. In this case, the transition was one pass more or less directly under the right head, but signal does leak into the left head. When processing signals in the MUD processor, this aggregate waveform is considered as a single signature waveform.

This is referred to as a "stacked" representation, where the signals from two diversities (here, the right and left heads) are stacked in the S matrix:

$$r = \begin{bmatrix} r_a \\ r_b \end{bmatrix} = \begin{bmatrix} S_a \\ S_b \end{bmatrix} \cdot A \cdot b = SAb.$$

To use this representation, data collected at the different heads would be stacked in the upper and lower portions of the received data vector r (which is received by MUD processor 130 on line 121 of FIG. 1), and processing would proceed as normal. Any angular offsets of the multiple read head assembly necessary to magnetically isolate the heads would result in delays of the pulses in each readback. This situation can be readily handled with position stamping, buffering the readback data, and undoing the delays. This procedure need not be particularly precise, since small residual delays can be represented in the upper or lower part of the S matrix.

Thus, the principles of the present invention can be employed in a MUD-aided data drive so as to provide an increase in storage density that is a function of how close the tracks are spaced. Independent of the lateral track spacing, the three-head MUD-aided disk drive embodiment described herein offers a 3-fold increase in the read speed, and a highly reliable data reading process of a densely packed drive. The techniques described herein can be applied to any storage medium where the sensor is close to a storage medium and there is relative motion defining in-track and cross-track interference. The sensing element picks up information signals and interference, and provides information processing of dense storage devices. The MUD processor then mitigates cross-track interference, thereby enabling a high quality, high density disk drive. Other benefits will be apparent in light of this disclosure. For example, it is desirable in many applications to minimize the power consumed by a digital recorder. Using a read mechanism configured in accordance with the principles of the present invention allows the disk to spin at a slower speed with slower clocking on the digital electronics used to process the signals read from the storage element, while the data rate remains the same. This is benefit is associated with an embodiment that decodes and outputs several adjacent tracks simultaneously.

The foregoing description of the embodiments of the invention has been presented for the purposes of illustration and description. It is not intended to be exhaustive or to limit the invention to the precise form disclosed. Many modifications and variations are possible in light of this disclosure. For example, the same issues that apply to disk drives also apply to magnetic tape systems, where the spacing of adjacent tracks on the tape is also limited by adjacent track interference. Embodiments of the present invention can thus be readily employed in tape drives to achieve separation of closely spaced interfering signals so as to allow greater data density on the tape, as well as faster access time and reduced device power consumption. It is intended that the scope of the invention be limited not by this detailed description, but rather by the claims appended hereto.

What is claimed is:

1. A device for reading data from a storage medium having a high track density prone to adjacent track interference, the device comprising:
    a data reader having one or more sensing elements adapted to read data from the storage medium, the read data including target track data as well as interference data from one or more adjacent tracks; and
    a multiuser detection module adapted to jointly detect and decode the read data corresponding to multiple tracks, thereby separating the target track data from interfering track data.

2. The device of claim 1 wherein the data reader includes a single sensing element adapted to make multiple passes over the storage medium, one pass for each adjacent track included in a group of tracks.

3. The device of claim 2 wherein the group of tracks is three to five adjacent tracks.

4. The device of claim 1 wherein the data reader includes multiple sensing elements for simultaneously sensing multiple tracks, with one or more sensing elements per each adjacent track included in a group of tracks.

5. The device of claim 4 wherein the group of tracks is three to five adjacent tracks.

6. The device of claim 4 wherein the multiple sensing elements are proximate one another.

7. The device of claim 1 wherein the data reader includes an analog-to-digital converter for converting the read data into its digital equivalent, and a buffer for storing the digital data, thereby allowing digital data from a group of adjacent tracks to be provided to the multiuser detection module.

8. The device of claim 1 wherein the storage medium having a high track density prone to adjacent track interference is one of a data storage tape or disk.

9. The device of claim 1 wherein a track transfer function includes envelope information of a shape, amplitude and phase of each track of a group of adjacent tracks read by the one or more sensing elements, and the multiuser detection module is operatively coupled with a parameter estimation module adapted to identify the track transfer function associated with the group.

10. The device of claim 1 further comprising:
    a data selector module adapted to receive separated and decoded track signals from the multiuser detection module, and to output requested data bits corresponding to at least one of a single track or multiple tracks.

11. The device of claim 1 wherein the device further includes a data writer and is capable of writing data to the storage medium.

12. The device of claim 1 wherein each of the one or more sensing elements is centered over at least one of a different radius on the storage medium or a different track on the storage medium or a different read line on the storage medium.

13. A method for reading data from a storage medium having a high track density prone to adjacent track interference, the method comprising:
    reading data from the storage medium, the read data including target track data as well as interference data from one or more adjacent tracks; and
    jointly detecting and decoding the read data corresponding to multiple tracks, thereby separating the target track data from interfering track data.

14. The method of claim 13 wherein reading data from the storage medium includes making multiple passes over the storage medium with a sensing element, one pass for each adjacent track included in a group of tracks.

15. The method of claim 14 wherein the group of tracks is at least three adjacent tracks.

16. The method of claim 13 wherein reading data from the storage medium includes simultaneously sensing multiple tracks, with one or more sensing elements per each adjacent track included in a group of tracks.

17. The method of claim 16 wherein the group of tracks is at least three adjacent tracks.

18. The method of claim 13 further comprising:
converting the read data into its digital equivalent; and
storing the digital data, thereby allowing digital data from a group of adjacent tracks to be provided to the multiuser detection module.

19. The method of claim 13 wherein a track transfer function includes envelope information of a shape, amplitude and phase of each track of a group of adjacent tracks read by one or more sensing elements, the method further comprising:
identifying the track transfer function associated with the group.

20. The method of claim 13 further comprising:
outputting requested data bits corresponding to at least one of a single track or multiple tracks.

21. The method of claim 13 wherein reading data from the storage medium further includes centering each of one or more sensing elements over at least one of a different radius on the storage medium or a different track on the storage medium or a different read line on the storage medium.

22. A device for reading data from a storage medium having a high track density prone to adjacent track interference, the device comprising:
one or more sensing elements adapted to read data from the storage medium, the read data including target track data as well as interference data from one or more adjacent tracks;
one or more positioning arms operatively coupled to the one or more sensing elements, and adapted to center each sensing element over at least one of a different radius on the storage medium or a different track on the storage medium or a different read line on the storage medium; and
a multiuser detection module adapted to jointly detect and decode the read data corresponding to multiple tracks, thereby separating the target track data from interfering track data.

* * * * *